(12) United States Patent
Edgar

(10) Patent No.: US 8,266,847 B2
(45) Date of Patent: Sep. 18, 2012

(54) THREE-DIMENSIONAL SOLAR ARRAYS

(76) Inventor: Ross Allan Edgar, Campbell Act (AU)

( * ) Notice: Subject to any disclaimer, the term of this patent is extended or adjusted under 35 U.S.C. 154(b) by 103 days.

(21) Appl. No.: 12/991,438

(22) PCT Filed: May 28, 2009

(86) PCT No.: PCT/AU2009/000670
§ 371 (c)(1),
(2), (4) Date: Nov. 7, 2010

(87) PCT Pub. No.: WO2009/143577
PCT Pub. Date: Dec. 3, 2009

(65) Prior Publication Data
US 2011/0056540 A1     Mar. 10, 2011

(30) Foreign Application Priority Data
May 30, 2008     (AU) ................................ 2008902716

(51) Int. Cl.
*E04D 13/18* (2006.01)
(52) U.S. Cl. ........................................ 52/173.3; 136/244
(58) Field of Classification Search ................ 52/173.3; 136/244, 245, 251; 126/623
See application file for complete search history.

(56) References Cited

U.S. PATENT DOCUMENTS

| | | | |
|---|---|---|---|
| 5,221,363 A | 6/1993 | Gillard | |
| 6,201,181 B1 * | 3/2001 | Azzam et al. | 136/244 |
| 6,384,314 B1 | 5/2002 | Lund-Hansen | |
| 6,515,217 B1 * | 2/2003 | Aylaian | 136/246 |
| 7,208,674 B2 * | 4/2007 | Aylaian | 136/251 |
| 7,554,030 B2 * | 6/2009 | Shingleton | 136/246 |
| 7,730,676 B2 * | 6/2010 | Hon | 52/173.3 |
| 7,847,183 B2 * | 12/2010 | Dame | 136/249 |
| 2003/0047207 A1 * | 3/2003 | Aylaian | 136/244 |
| 2004/0084077 A1 * | 5/2004 | Aylaian | 136/246 |
| 2009/0101193 A1 | 4/2009 | Hsiao | |
| 2009/0120486 A1 | 5/2009 | Buller | |
| 2010/0065108 A1 * | 3/2010 | West et al. | 136/251 |
| 2010/0243021 A1 * | 9/2010 | Lee et al. | 136/244 |
| 2011/0067748 A1 * | 3/2011 | Pfeiffer | 136/246 |
| 2011/0303215 A1 * | 12/2011 | Chuang | 126/623 |

FOREIGN PATENT DOCUMENTS

| | | |
|---|---|---|
| JP | 2000213255 A | 8/2000 |
| JP | 2001082058 A | 3/2001 |
| JP | 2005252163 A | 9/2005 |

OTHER PUBLICATIONS

Australian Patent Office, International Search Report, Jun. 30, 2009, Woden Act, Australia.

* cited by examiner

*Primary Examiner* — Jeanette E Chapman
*Assistant Examiner* — James Buckle, Jr.
(74) *Attorney, Agent, or Firm* — Louis Ventre, Jr.

(57) ABSTRACT

An assembly for retaining a plurality of photovoltaic modules in a three-dimensional array, the assembly including a plurality of overlapping vertically spaced grid layers each defining a plurality of horizontally spaced positions, wherein the photovoltaic modules are arranged and retained in the positions of successive grid layers in substantially non-overlapping vertical relationship so that none of the photovoltaic modules in any grid layer substantially vertically occludes any other of the photovoltaic modules in any other grid layer.

3 Claims, 7 Drawing Sheets

THREE-DIMENSIONAL SOLAR ARRAYS

FIELD OF THE INVENTION

The present invention relates to three-dimensional solar arrays of photovoltaic modules.

BACKGROUND OF THE INVENTION

Photovoltaic modules are commonly mounted in two-dimensional planar arrays in contiguous side-by-side relationship. This so-called "panel clustering" hinders cooling of individual photovoltaic modules in the array and increases the wind pressure on their supports. The lack of effective cooling reduces the power output of individual photovoltaic modules and hence the total power output of the array, while the higher wind pressure necessitates heavier structural supports to mount and use photovoltaic modules outdoors.

What is needed is a solution which addresses the above difficulties.

SUMMARY OF THE INVENTION

According to the present invention, there is provided an assembly for retaining a plurality of photovoltaic modules in a three-dimensional array, the assembly including a plurality of overlapping vertically spaced grid layers each defining a plurality of horizontally spaced positions, wherein the photovoltaic modules are arranged and retained in the positions of successive grid layers in substantially non-overlapping vertical relationship so that none of the photovoltaic modules in any grid layer substantially vertically occludes any other of the photovoltaic modules in any other grid layer.

The photovoltaic modules can respectively include one or more photovoltaic cells surrounded by a peripheral frame, wherein the photovoltaic modules are arranged and retained in the positions of successive grid layers so that the peripheral frames of the photovoltaic modules at least partially vertically overlap one another, but the photovoltaic cells of any of the photovoltaic modules remain substantially vertically unoccluded by any other of the photovoltaic modules.

Successive grid layers can be interconnected by vertical and inclined web members.

The grid layers can be selectively formed from wire mesh, horizontal chord members, criss-crossed cables, and combinations thereof.

The assembly can be a multilayer space grid structure, for example, a double- or triple-layer space grid structure.

The assembly can further include corner brackets to interlock adjacent corners of the photovoltaic modules to one another, and to adjacent corners of the positions of the grid layers.

The corner brackets can respectively include opposite facing corner clamps that are connectable to one another by fasteners so as to clamp around adjacent corners of both the photovoltaic modules and the positions of the grid layers.

The positions of the grid layers and the photovoltaic modules can have a complementary plan shape selected from square, rectangular, triangular, hexagonal, and other two-dimensional geometric shapes whose repetition will fill two-dimensional space densely.

The assembly can further include a two-axis mount to allow the assembly to rotate about polar and horizontal axes so that the photovoltaic modules in successive grid layers can directionally track the sun.

The present invention further provides a method for retaining a plurality of photovoltaic modules in a three-dimensional array, the method including the steps of providing a plurality of overlapping vertically spaced grid layers each defining a plurality of horizontally spaced positions, and arranging and retaining the photovoltaic modules in the positions of successive grid layers in substantially non-overlapping vertical relationship so that none of the photovoltaic modules in any grid layer substantially vertically occludes any other of the photovoltaic modules in any other grid layer.

The present invention also provides a three-dimensional array of photovoltaic modules including the above assembly, or formed using the above method.

BRIEF DESCRIPTION OF THE DRAWINGS

The invention will be further described by way of example only with reference to the accompanying drawings, in which.

DETAILED DESCRIPTION

Figure 1:
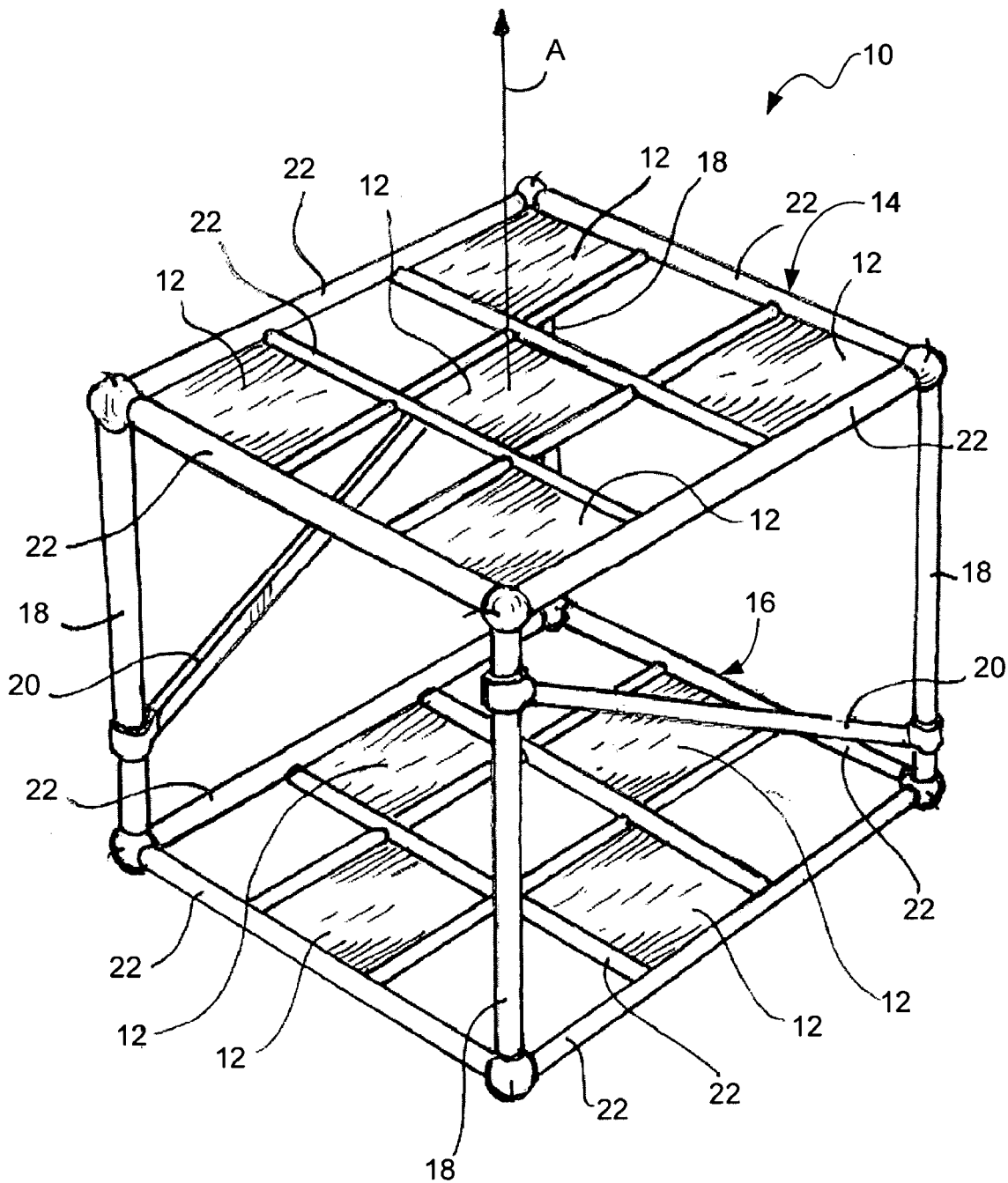
FIG. 1 is a perspective view of an embodiment of an assembly for retaining photovoltaic modules in a three-dimensional solar array.
Figure 2:
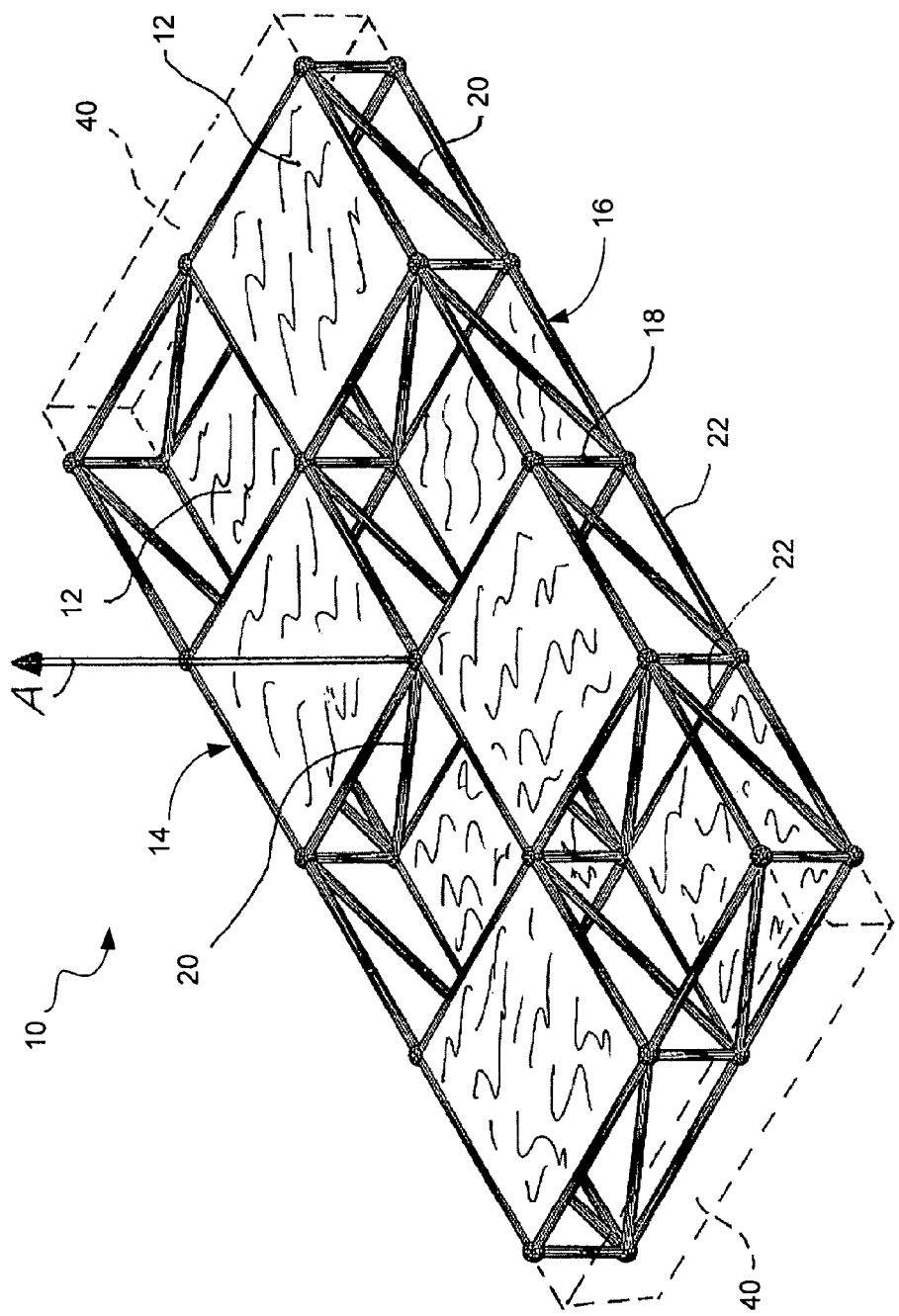
FIG. 2 is a perspective view of another embodiment of an assembly.

FIGS. 1 and 2 illustrate embodiments of an assembly 10 for retaining a plurality of photovoltaic modules 12 in a three-dimensional solar array. The assembly 10 includes overlapping upper and lower grid layers 14, 16 each defining a plurality of horizontally spaced positions. The upper and lower grid layers 14, 16 are generally mutually parallel and generally planar. Other equivalent non-parallel and non-planar grid layers may also be used provided the photovoltaic modules 12 can be collectively oriented in the general direction of arrow A towards the sun to collect solar radiation.

The upper and lower grid layers 14, 16 are interconnected by vertical and inclined web members 18, 20. The upper and lower grid layers 14, 16 are formed, for example, from interconnected horizontal chord members 22. Other equivalent arrangements may also be used to form the grid layers, for example, wire mesh, criss-crossed cables, etc. Together, the interconnected vertical and inclined web members 18, 20 and the horizontal chord members 22 form a rigid double-layer space grid structure (or space frame). Other equivalent rigid space grid structures (or space frames) may also be used, for example, three- or four-layer space grid structures, etc.

Figure 4:
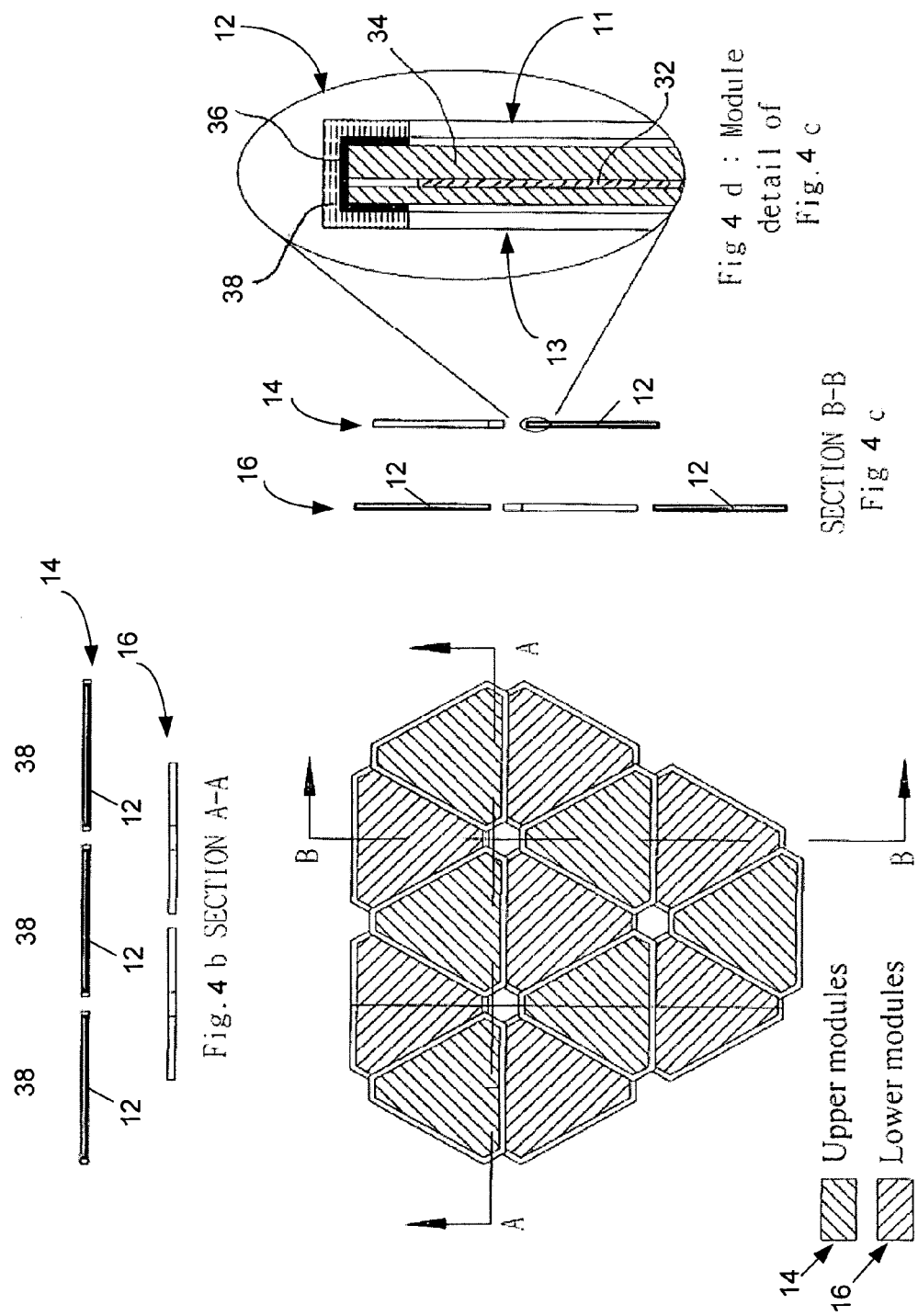
FIGS. 4 and 5 are plan and sectional views of embodiments of two- and three-layer assemblies of photovoltaic modules of the invention.

Referring to FIG. 4(d), each photovoltaic module 12 has an upper active face 11 and a lower inactive face 13. The upper active face 11 has one or more photovoltaic cells 32 arranged under glass 34 to receive solar radiation. The glass 34 is weatherproofed by a seal 36 and a peripheral frame 38.

The photovoltaic modules 12 of the upper and lower grid layers 14, 16 are electrically connected, for example in series, to provide the three-dimensional solar array with a cumulative power output. The positions of the upper and lower grid layers 14, 16 and the photovoltaic modules 12 have, for example, a complementary square plan shape. Other complementary plan shapes may also be used, for example, rectangular, triangular, hexagonal, and other two-dimensional geometric shapes whose repetition will fill two-dimensional space densely.

The photovoltaic modules 12 are arranged and retained in the positions of the upper and lower grid layers 14, 16 in substantially non-overlapping vertical relationship so that none of the photovoltaic modules 12 in the upper grid layer 14 substantially vertically occludes any other of the photovoltaic modules 12 in the lower grid layer 16. In use, this compact arrangement allows all of the photovoltaic modules 12 in the three-dimensional array of the assembly 10 to remain exposed to receive solar radiation, and hence optimises collection of solar radiation in a space-efficient manner. In addition, both the vertical and horizontal spacing between the photovoltaic modules 12 in the assembly 10 promotes cooling of individual photovoltaic modules 12, and thereby promotes optimal power generation by the three-dimensional solar array. Further, the separation of photovoltaic modules 12 in and between grid layers 14, 16 allows for the passage of wind to reduce wind loading on the assembly 10.

The dashed lines in FIG. 2 represent a two-axis mount 40 to allow the assembly 10 to rotate about polar and horizontal axes so that the photovoltaic modules in the upper and lower layers 14, 16 can directionally track the sun. An embodiment of the two-axis mount 40 is described in detail below with reference to FIGS. 6 and 7.

Figure 3:
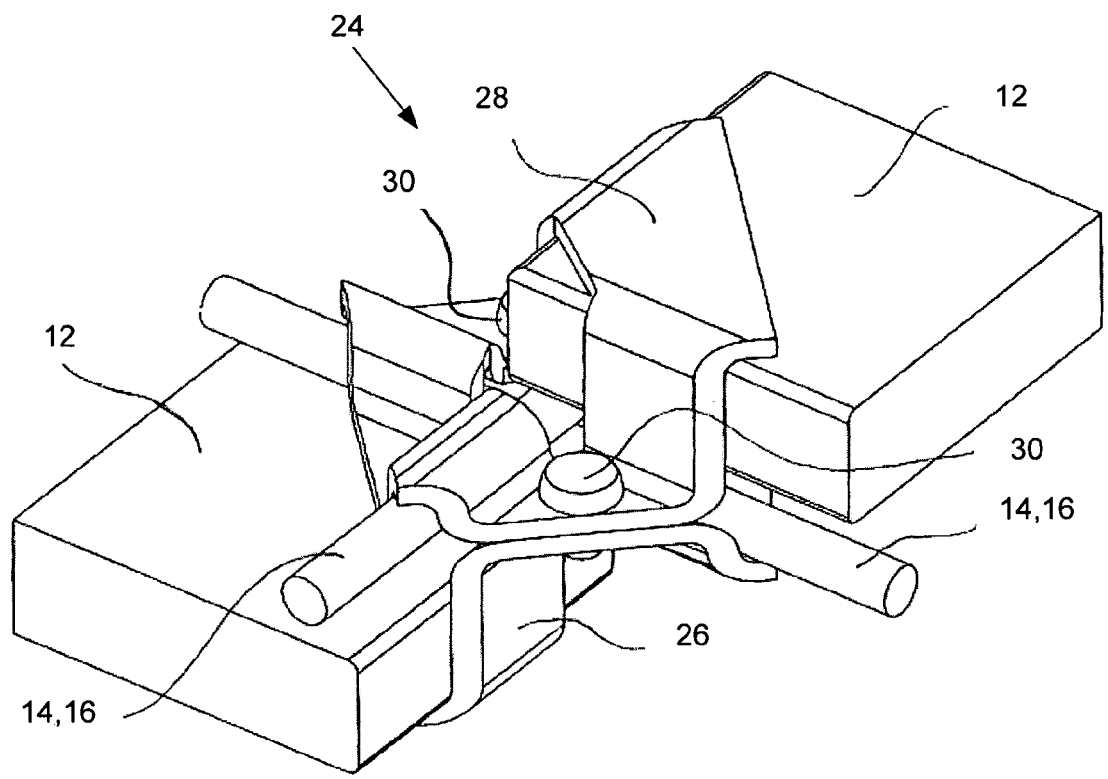
FIG. 3 is a perspective view of a corner bracket to retain the photovoltaic modules in the assembly.

Referring to FIG. 3, assembly 10 further includes corner brackets 24 to interlock adjacent corners of the photovoltaic modules 12 to one another, and to adjacent corners of the positions in the upper and lower grid layers 14, 16. The corner brackets 24 respectively include opposite facing corner clamps 26, 28 that are connectable to one another by fasteners 30 so as to clamp over and down on opposite sides of adjacent corners of both the photovoltaic modules 12 and the positions in the upper and lower grid layers 14, 16. Other equivalent couplings may also be used to retain the photovoltaic modules 12 in the positions of the upper and lower grid layers 14, 16. Electrical cabling (not shown) interconnecting adjacent photovoltaic modules 12 in each grid layer in series may be retained by the corner brackets 24 to run, for example, diagonally corner-to corner underneath the lower inactive faces of the photovoltaic modules 12 so as to avoid vertically occluding the upper active faces of photovoltaic modules in an underlying grid layer.

Figure 5:
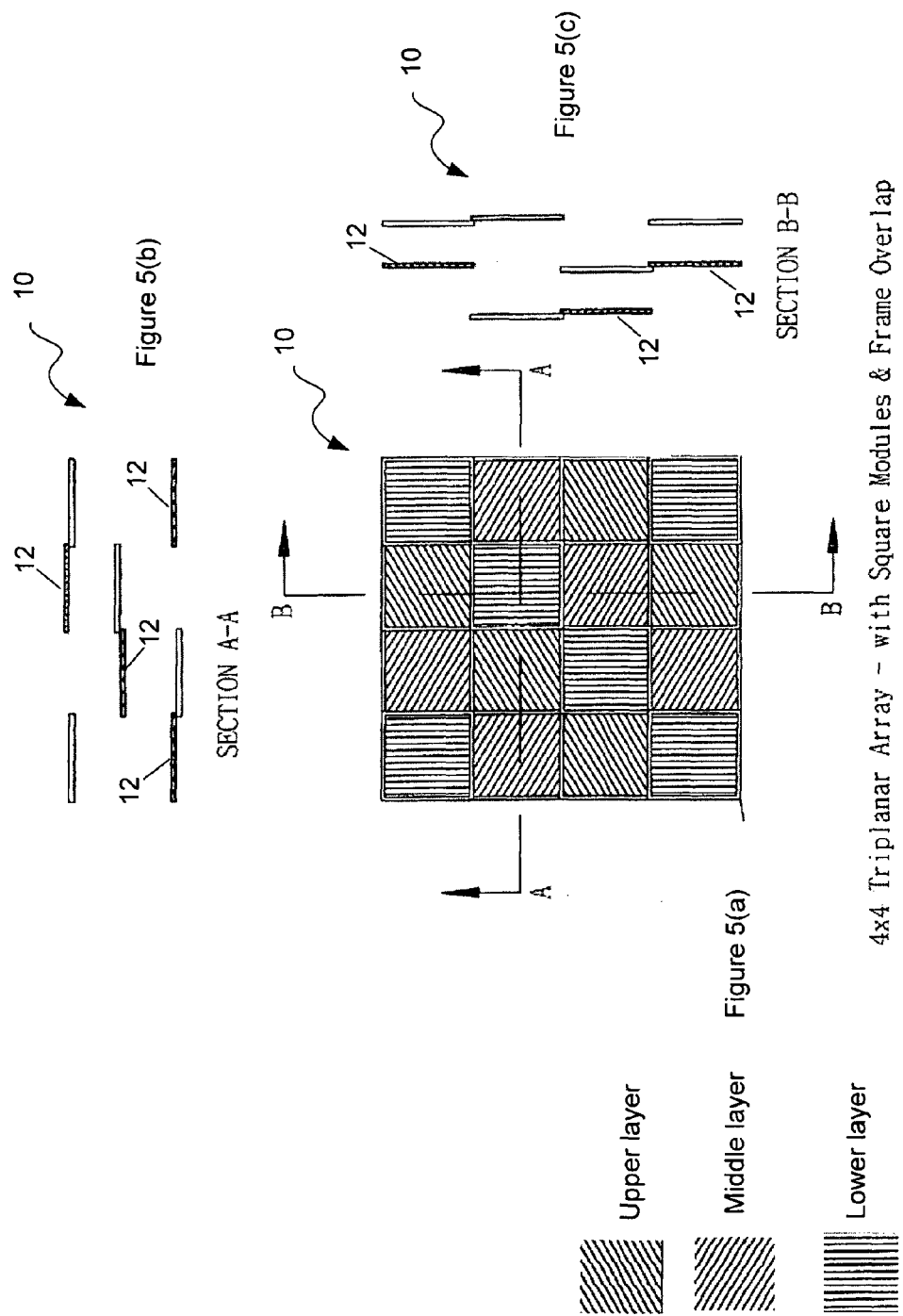

FIGS. 4(a) to (c) illustrate an embodiment of an assembly 10 in which photovoltaic modules 12 with a triangular plan shape are arranged and retained in positions of upper and lower grid layers 14, 16 (represented by alternate cross-hatching) with a hexagonal plan shape (note that the structural elements of the assembly 10 have been omitted for clarity). The peripheral frames 38 of the photovoltaic modules 12 of the upper and lower grid layers at least partially vertically overlap one another, but the photovoltaic cells 32 on the upper active faces 11 of the photovoltaic modules 12 in the lower layer remain substantially vertically unoccluded by the photovoltaic cells 32 of the photovoltaic modules 12 in the upper layer. In use, this compact arrangement allows the upper active faces 11 of all of the photovoltaic modules 12 in three-dimensional solar array to remain exposed to receive solar radiation. In addition, both the vertical and horizontal spacing between the photovoltaic modules 12 in the assembly 10 promotes cooling of individual photovoltaic modules 12, and thereby promotes optimal power generation by the three-dimensional solar array. FIG. 5 illustrates an embodiment of a three-layer assembly 10 of photovoltaic modules 12 (upper, middle and lower grid layers represented by alternate cross-hatching) with vertically overlapping peripheral frames, but with vertically unoccluded active faces of photovoltaic cells which remain exposed to receive solar radiation (note that the structural elements of the assembly 10 have been omitted for clarity).

Figure 6:
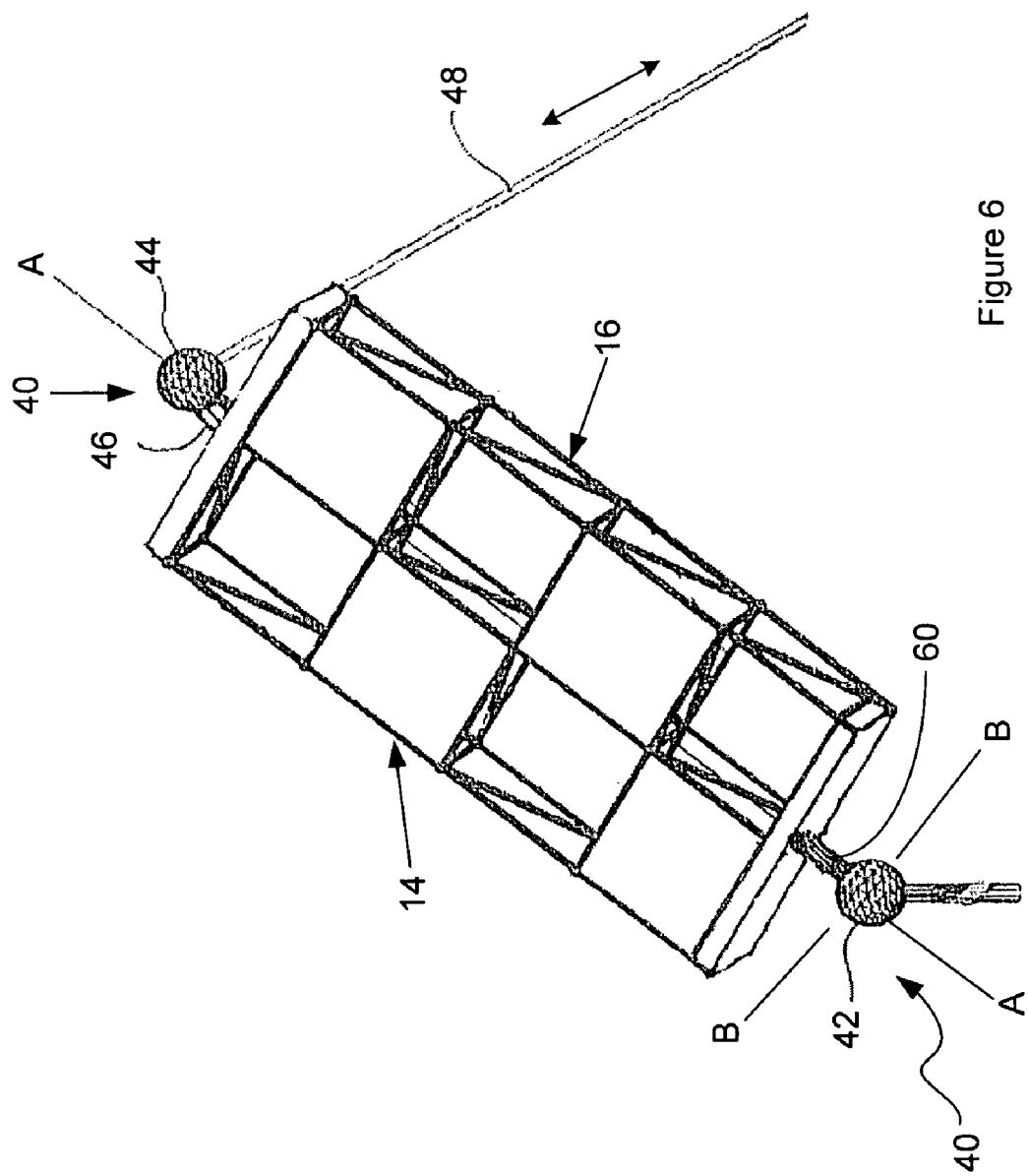
FIG. 6 is a perspective view of an embodiment of a two-axis mount for the assembly of FIG. 2.
Figure 7:
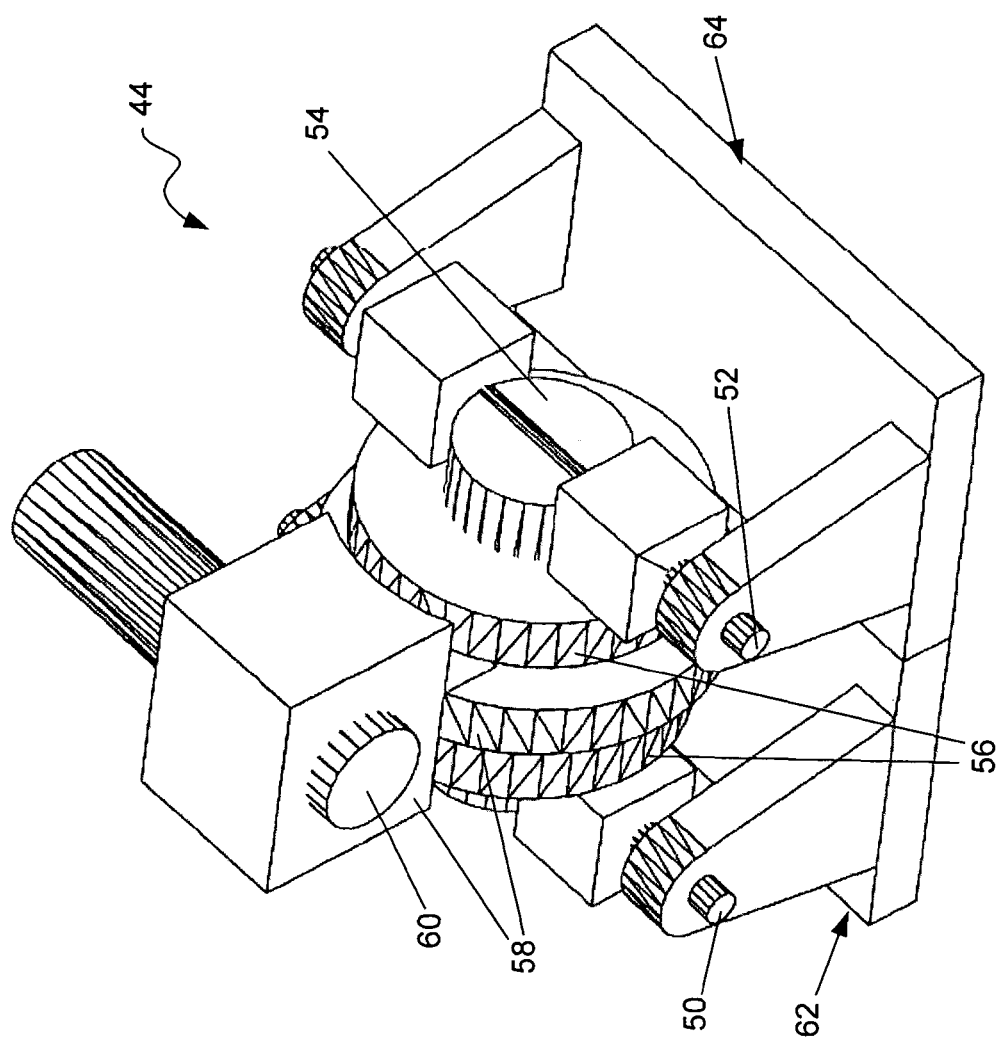
FIG. 7 is a perspective view of a double-axis joint used in the two-axis mount of FIG. 6.

FIG. 6 illustrates an embodiment of a two-axis mount 40 to allow the assembly 10 to rotate about polar and horizontal axes so that the photovoltaic modules in the upper and lower layers 14, 16 can directionally track the sun. The two-axis mount 40 is operatively connected to motor drives (not shown) controlled by a controller (not shown) programmed with solar tracking software. The two-axis mount 40 includes upper and lower joints 42, 44 which allow the assembly 10 to rotate about both a polar axis A-A and a horizontal axis B-B. Rotation about the horizontal axis B-B (or elevation of the assembly 10) is driven by simultaneous extension and retraction of two mutually inclined linear actuators 46, 48 that converge at the upper joint 44. FIG. 7 illustrates an embodiment of the upper joint 44 which includes two parallel shafts 50, 52 linked via a shaft 54 having thrust bearings 56 mounted thereon. A bearing carrier 58 rotates about a shaft 54, and a polar rotation shaft 60 is held by the bearing carrier 58. Rotation of two interface plates 62, 64 about the two parallel shafts 50, 52 accommodates the change in apex angle at the joint 44 resulting from concurrent change in the length of the actuators 46, 48. One end of polar rotation shaft 60 is held by the bearing carrier 58 and the other end by the lower joint 42. The lower joint 42 is, for example, a yoke (not shown) which supports a central bearing (not shown) to rotate about the horizontal axis B-B. The lower end of the polar rotation shaft 60 is held by the central bearing of the yoke to allow the elevation of the polar rotation shaft 60 to be varied to directionally track the sun. Other equivalent mounts and/or joints may also be used to allow the assembly 10 to rotate about polar and/or horizontal axes.

The embodiments have been described by way of example only and modifications are possible within the scope of the claims which follow.

The invention claimed is:

1. An assembly for retaining a plurality of photovoltaic modules in a three-dimensional array, the assembly comprising a plurality of overlapping vertically spaced grid layers each defining a plurality of horizontally spaced positions, wherein the photovoltaic modules are arranged and retained in the positions of successive grid layers in substantially non-overlapping vertical relationship so that none of the photovoltaic modules in any grid layer substantially vertically occludes any other of the photovoltaic modules in any other grid layer.

2. An assembly according to claim 1, further comprising a one- or two-axis mount to allow the assembly to be rotated so that the photovoltaic modules in successive grid layers can directionally track the sun.

3. A method for retaining a plurality of photovoltaic modules in a three-dimensional array, the method comprising the steps of
    providing a plurality of overlapping grid layers each defining a plurality of horizontally spaced positions, and
    arranging and retaining the photovoltaic modules in the positions of successive grid layers in substantially non-overlapping vertical relationship so that none of the photovoltaic modules in any grid layer substantially vertically occludes any other of the photovoltaic modules in any other grid layer.

* * * * *